US010405688B2

(12) United States Patent
Lin

(10) Patent No.: US 10,405,688 B2
(45) Date of Patent: Sep. 10, 2019

(54) ADVANCED MUG CAP APPARATUS

(71) Applicant: Shin-Shuoh Lin, Laguna Hills, CA (US)

(72) Inventor: Shin-Shuoh Lin, Laguna Hills, CA (US)

(*) Notice: Subject to any disclaimer, the term of this patent is extended or adjusted under 35 U.S.C. 154(b) by 175 days.

(21) Appl. No.: 15/597,456

(22) Filed: May 17, 2017

(65) Prior Publication Data

US 2018/0273260 A1 Sep. 27, 2018

Related U.S. Application Data

(60) Provisional application No. 62/475,230, filed on Mar. 23, 2017.

(51) Int. Cl.
*A47J 31/06* (2006.01)
*A47G 19/22* (2006.01)
(Continued)

(52) U.S. Cl.
CPC .......... *A47J 31/0636* (2013.01); *A47G 19/14* (2013.01); *A47G 19/16* (2013.01); *A47G 19/22* (2013.01);
(Continued)

(58) Field of Classification Search
CPC ............ B65D 51/28; B65D 2251/0053; B65D 2251/0075; B65D 2251/0021;
(Continued)

(56) References Cited

U.S. PATENT DOCUMENTS 4,717,050 A * 1/1988 Wright ............... B65D 47/0885
220/259.2
5,775,205 A * 7/1998 Melton ................. A47G 19/16
99/322

(Continued)

*Primary Examiner* — James N Smalley
(74) *Attorney, Agent, or Firm* — Alexander Chen, Esq.; Agnew International Patent & Trademark Law Firm

(57) ABSTRACT

A mug cap apparatus for brew-through comprising a cylindrical body having a primary hallow opening in the center and at least one cylindrical body attaching tab formed around the cylindrical body; the cylindrical body attaching tab formed a recess; a secondary opening positioned in the cylindrical body and within the recess; a first lid having a blade edge for ease of opening and a sealer that seals the secondary opening when the first lid is in closed configuration; the first lid further comprises at least one attachment point; a second lid having at least one second lid attaching tab wherein the second lid attaching tab comprises at least one first attachment point to the first lid and at least one second attachment point to the cylindrical body attaching tab; where the first attachment point and the second attachment point are positioned in linear space apart along the edge of the cylindrical body attaching tab; wherein the first attachment point is positioned in proximity to the center of the hallow opening and the second attachment point is positioned in proximity to the edge of the hallow opening; wherein the second lid further comprises a sealer that seals the primary hallow opening when in closed configuration; wherein in lifting the first lid in open configuration will result in lifting the second lid.

4 Claims, 4 Drawing Sheets

(51) Int. Cl.
*A47G 19/16* (2006.01)
*A47G 19/14* (2006.01)

(52) U.S. Cl.
CPC ........... *B65D 2251/0021* (2013.01); *B65D 2251/0053* (2013.01); *B65D 2251/0075* (2013.01); *B65D 2251/0081* (2013.01)

(58) Field of Classification Search
CPC ... B65D 2251/0081; B65D 2543/00046; A47J 31/0636
USPC ...... 220/212, 521, 523, 254.2, 259.1, 259.2; 426/77, 435; 99/322
See application file for complete search history.

(56) References Cited

U.S. PATENT DOCUMENTS

| | | | | |
|---|---|---|---|---|
| 7,464,637 B1* | 12/2008 | Lin | ...................... | A47J 31/0636 99/317 |
| 9,801,492 B1* | 10/2017 | Lin | ......................... | A47J 31/20 |
| 2011/0162532 A1* | 7/2011 | Gilbert | .................... | A47J 31/20 99/290 |
| 2011/0226133 A1* | 9/2011 | Shen | ...................... | A47J 31/005 99/316 |
| 2013/0206717 A1* | 8/2013 | Lane | ........................ | A47J 31/18 215/6 |
| 2015/0053090 A1* | 2/2015 | Berger | ................ | A47J 31/0636 99/295 |
| 2016/0262565 A1* | 9/2016 | Beckman | ............ | A47J 31/0636 |

* cited by examiner

ADVANCED MUG CAP APPARATUS

INCORPORATION BY REFERENCE

This application claims the benefit of priority under 35 U.S.C. 119(e) to the filing date of U.S. provisional patent application No. 62/475,230, titled "Method and System for Making Vacuum Mug Caps and Filters," which was filed on Mar. 23, 2017, and which is incorporated herein by reference in its entirety.

FIELD OF THE INVENTION

The present invention relates to beverage containers, and, more specifically, to making a convenient, time-saving mug cap with a multifunctional cap that allows sipping and brew-through refilling without sacrificing the insulation function of the mug.

BACKGROUND OF THE INVENTION

Coffee and tea pots have been used for centuries to brew coffee or tea. The common method has been pouring hot water over the coffee grinds or tea leafs, and allowing the water to infuse and extract the soluble solids from the brew product. A later improvement provided a straining means located near the opening's neck permitting the brewing to take place without having to sift the brew waste from the beverage. This improvement was advantageous but required removing the straining device prior to pouring; that is, removing the straining device while the brew is still hot. This drawback has been overcome with a stopper/cap that has both an opening for pouring the beverage and an opening for the strainer/filter.

Although brewing pots has advanced, and more convenient, as people get busier, they do not have time for brewing a perfect cup of coffee or tea notwithstanding a brewing pot that conveniently separates the brew waste and the brew. Furthermore, they also want to keep their beverages warmer longer so they can get the best tastes. These desires have been met with a variety of mugs, that insulates the beverage inside from the temperature outside, and has become a modern convenience that busy coffee or tea drinkers and commuters cannot function without. The more convenient and functional mugs get, the more often and more people use them. In recent years, among other changes, mug caps are improved substantially and provide more utility.

For example, a mug with a stopper or screw cap that has both an infuser, and an opening for sipping has allowed a coffee or tea drinker to brew her coffee or tea on the go as if the user takes a brewing pot with her. The vacuum mug keeps the hot water hot, so the coffee or tea in the strainer or infuser has time to brew while the user travels to the workplace. With the sipper separate from the strainer or infuser, the user does not have to wait until arriving at the office to enjoy the beverage. She can enjoy the beverage while driving without removing the strainer or infuser.

While some mugs have caps that have both, a sipper and infuser, access to the infuser requires removing the caps completely from the mugs, or a separate clumsy, inconvenient second lid. For today's busy professionals and tea or coffee drinkers, removing the cap to fill or refill is time consuming and inconvenient, and, thus, defeats one of the utilities of mugs which is to provide convenience access to beverage they want.

Therefore, it is desirable to have a spill-proof, direct-drink type cap with push-up lid, and a convenient, time-saving brew-through lid for filling or re-filling.

OBJECT OF THE INVENTION

Accordingly, it is the object of this invention to create a mug that allows brewing and enjoying the brew while traveling.

It is the object of this invention to create a mug that maintains the temperature of the contained beverage for brewing effectiveness and taste.

It is the object of this invention to create a mug that separates the brew waste and the brew without the need of sifting the brew leftover from the brew.

It is an object of the invention to create a mug that allows immediate beverage consumption without the need of removing the brew leftover.

It is an object of the invention to create a mug cap that is spill-proof, direct-drink and brew-through.

It is an object of the invention to create a mug cap with a spill-proof, direct-drink, brew-through, double-hinge and multifunctional lid.

It is an object of the invention to create a mug with a cap that fits a coffee or tea POD machine, and is brew-through.

SUMMARY OF INVENTION

A invention directed to a mug cap apparatus is disclosed comprising a cylindrical body having a primary hallow opening in the center and at least one cylindrical body attaching tab formed around the cylindrical body; the cylindrical body attaching tab formed a recess; a secondary opening positioned in the cylindrical body and within the recess; a first lid having a blade edge for ease of opening and a sealer that seals the secondary opening when the first lid is in closed configuration; the first lid further comprises at least one attachment point; a second lid having at least one second lid attaching tab wherein the second lid attaching tab comprises at least one first attachment point to the first lid and at least one second attachment point to the cylindrical body attaching tab; where the first attachment point and the second attachment point are positioned in linear space apart along the edge of the cylindrical body attaching tab; wherein the first attachment point is positioned in proximity to the center of the hallow opening and the second attachment point is positioned in proximity to the edge of the hallow opening; wherein the second lid further comprises a sealer that seals the primary hallow opening when in closed configuration; wherein in lifting the first lid in open configuration will result in lifting the second lid. In one embodiment, a hallow cylindrical strainer wherein the hallow cylindrical strainer is attached to the cylindrical body wherein the primary hallow opening is connected to the hallow portion of the cylindrical strainer. In one embodiment, the hallow cylindrical strainer further comprises circular filtration holes around its cylindrical surface. In one embodiment, the hallow cylindrical strainer further comprises elongated filtration slits around its cylindrical surface.

In yet another aspect of the invention, a mug cap with an infuser comprises a mug cap and at least one infuser wherein the mug cap comprises a top, a sipper opening, a strainer opening, two bumps arising from the top, a recess in the middle of the top between the two bumps, a first lid disposed snugly in the recess, and a second lid disposed below the first lid; wherein the first lid swings upon a horizontal hole-and-pen hinge that is disposed about the middle of the top;

wherein the two bumps are split longitudinally and the two halves of each the bump scissor away on a pivot pin at the one end of the bump; wherein the second lid is attached to the bottoms of the inner halves of the bumps; wherein the first lid acts as a pull tab for the second lid; wherein the infuser can be inserted and removed through the strainer opening when the second lid is open.

In one embodiment, the first lid plugs and seals the sipper opening. In one embodiment the second lid plugs and seals the strainer opening. In one embodiment infuser is perforated. In one embodiment the mug cap has slip-free ribs on the outer wall of the cylindrical section. In one embodiment the mug cap is a screw cap.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

The present invention has been conceived with the aim of addressing one or more of the current vacuum mug caps' limitations. More specifically, the present invention is directed to a vacuum mug cap that is spill-proof, double-hinge, and double-function to solve the current limitations.

Figure 1:
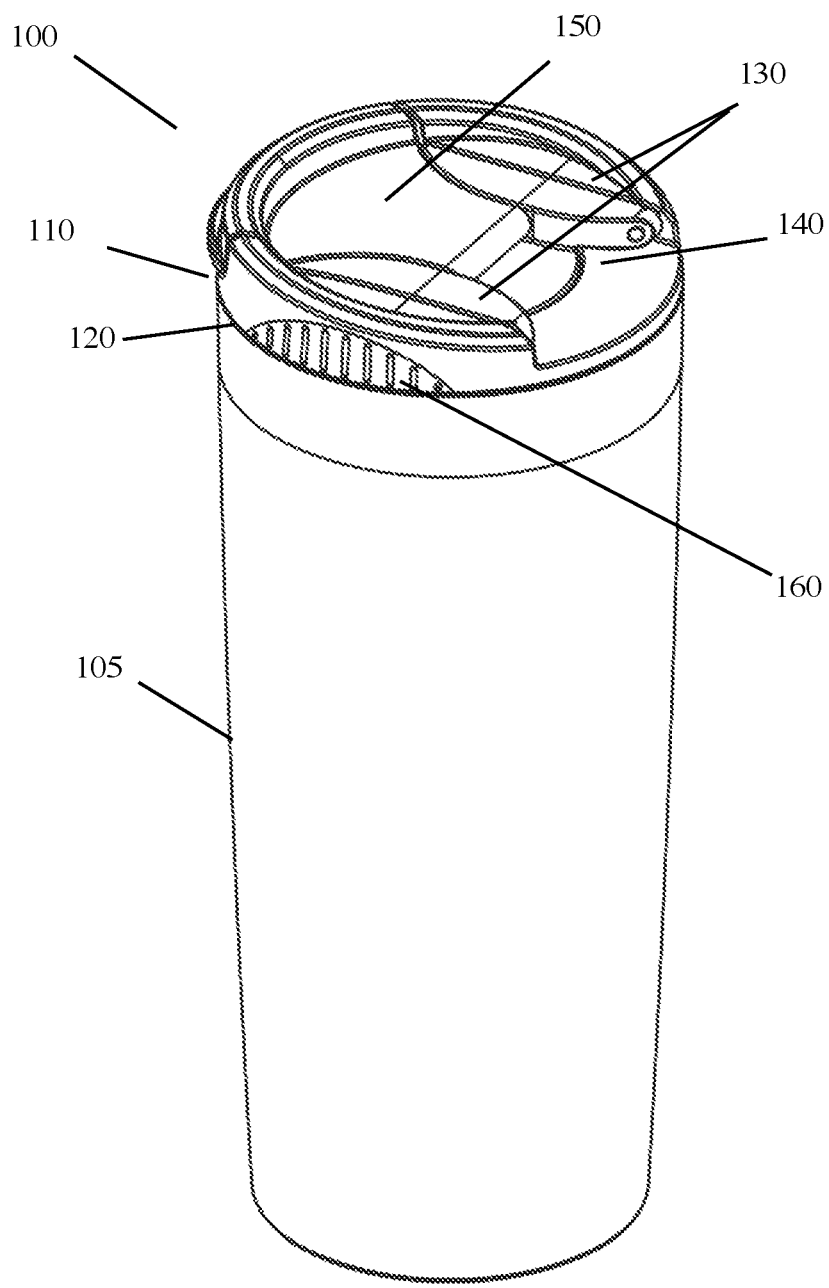
FIG. 1 is a perspective view of a mug and its cap being fully assembled and in a closed position.

Referring to FIG. 1, in this embodiment, a mug 100 is shown fully assembled, closed and sealed. The mug comprises a tumbler 105 and a screw cap 110. The round screw cap 110 comprises a top 120, two pointy oval bumps 130 arising from the top, opposite each other, forming part of the cap's perimeter, that, consequently, create a recess 140 in the middle of the top between the two oval bumps, and shaped like a symmetrical double edged battle axe head, and a lid 150 shaped like a symmetrical single edged battle axe head, disposed snugly in the one half of the recess 140. Obviously, the arch of the lid's 150 edge equals the arches of the recess 140, and, thus, that of the round cap, for the lid 150 to fit snugly in the recess 140. In FIG. 1, the lid 150 is in the first position which is the closed position of the cap. The lid fits snugly in the one half of the recess, and closes a sipper opening. In addition, there are molded easy-grip ribs 160 on the outside walls of the oval bumps, and, thus, of the cap.

Figure 2:
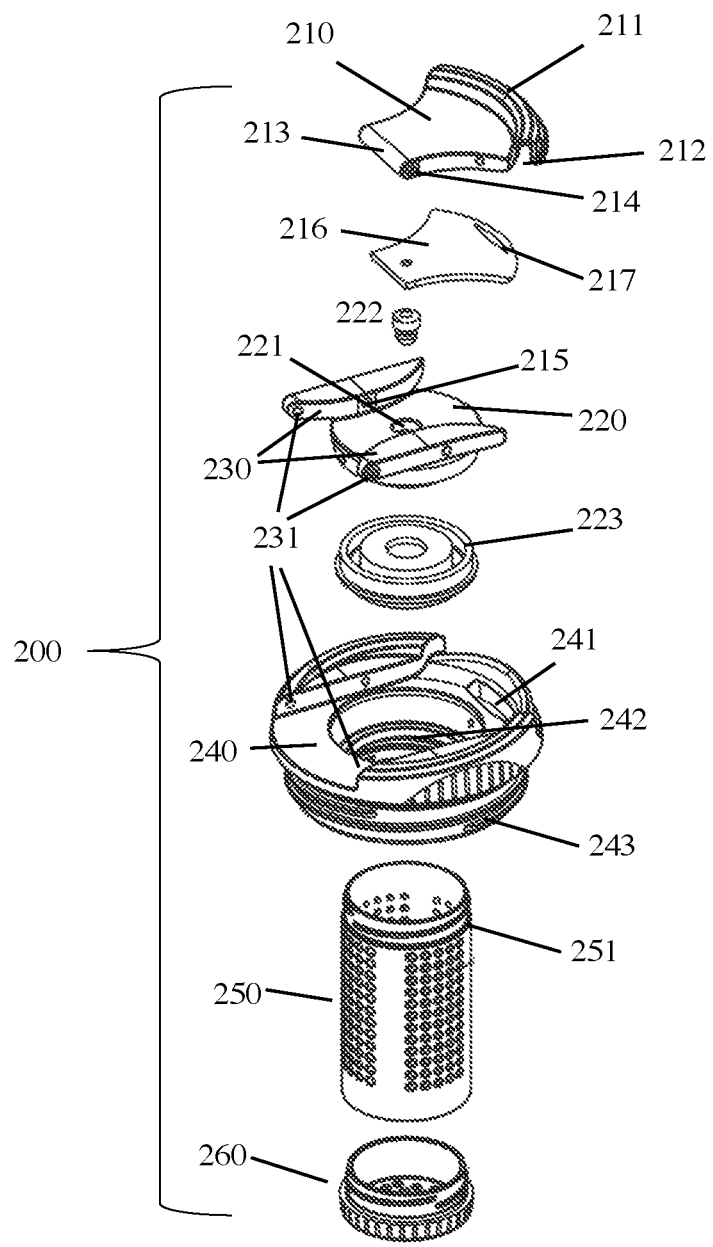
FIG. 2 is an exploded view of an exemplary mug cap and infuser.

Referring to FIG. 2, an exploded view of an exemplary mug cap and its components, and their relative positions is shown. A mug screw cap 200 comprises a lid 210 that has a shape of a symmetrical single edged battle axe head. The lid 210 further comprises an edge or a blade 211 that is upwardly convex, and, thus, a groove 212 is formed beneath, that snaps fit to a raised rim of the mug cap 200. The lid 210 further comprises a shoulder 213 that has a horizontal tube disposed longitudinally passing through the shoulder 213. The horizontal tube allows a pen 214 of a hole-and-pen hinge pass through. To complete the hinge, about the midway of the pointy oval bumps 230, on the inside walls, there are a pair of recesses 215 to receive the pen 214, and these recesses, the pen, and the horizontal tube form the hinge, upon which the lid 210 can swing from the one half of the recess to the other half. The lid 210 further comprises a bottom 216 that is usually made of silicone or similar elastic materials, and the bottom 216, in turn, comprises a downward protruding tab 217 that plugs a sipper opening 241 on the top of the cap. When assembled, the bottom 216 is attached to the lid 210 by a variety of attachment methods. When the lid 210 is swung to the other side of the recess 240, the protruding tab 217 is pulled from the sipper opening 241, unplugs it, and open it to let the beverage flow through when the mug is tipped.

Still referring to FIG. 2, in the first open position of the cap, the lid 210 is flipped, from the closed position, to the other half of the recess 240 and fits snugly. A second lid 220 previously hidden under the first lid 210 is exposed. The second lid 220 is round and attached or molded to the bottoms of the inner halves of the oval bumps 230, which, in this embodiment, are split along the major axes. In the center of the second lid 220, a hole 221 is made, and, perhaps, countersink. The hole 221 receives a screw 220 that attaches a bottom 223 to the bottom of the lid 220. It is appreciated that a variety of attachment methods can be used to attach the bottom 223. The bottom 223 is usually made of silicone or similar elastic materials. The bottom 223 perimeter snugly fits a second opening 242 on the top of the cap. In the closed position, the second lid 220 and its attached bottom 223 press against the second opening 242 lip tight and seals any gaps between the silicone bottom 223 and the second opening 242.

In the second open position of the cap, the second lid 220 is yanked open by a user pulling the first lid 210 functioning as a pull tab. This motion can be done because the first lid 210, or the pull tab, is attached by the hinge to the inner halves of the oval bumps 230, which, in turn, are attached to the second lid 220, as disclosed above. The second lid 220 and the inner halves of the oval bumps 230 form a flapper lid with the two inner halves being the two arms. The two halves of the oval bump 230 then scissor away from each other on a pivot pin 231 disposed at the one end of the major axis. The second opening 242 can accommodate a removable infuser.

Still referring to FIG. 2, a cylindrical section 243 of the mug cap under the top thereof is male threaded to mate with the female threads on the inner wall of the neck of the tumbler 105. In this embodiment, a perforated, cylindrical infuser/strainer 250 is used. The neck 251 of the cylindrical strainer 250, near the lip, is male threaded to mate with the female threaded inner wall of the second opening 242. The strainer 250 has a detachable bottom 260, that is also perforated. The strainer bottom 260 use a screw cap attachment to attach to the bottom opening of the strainer 250. It is appreciated that other embodiments can have fused bottom, or attached bottom with a variety of attachment methods.

Figure 3:
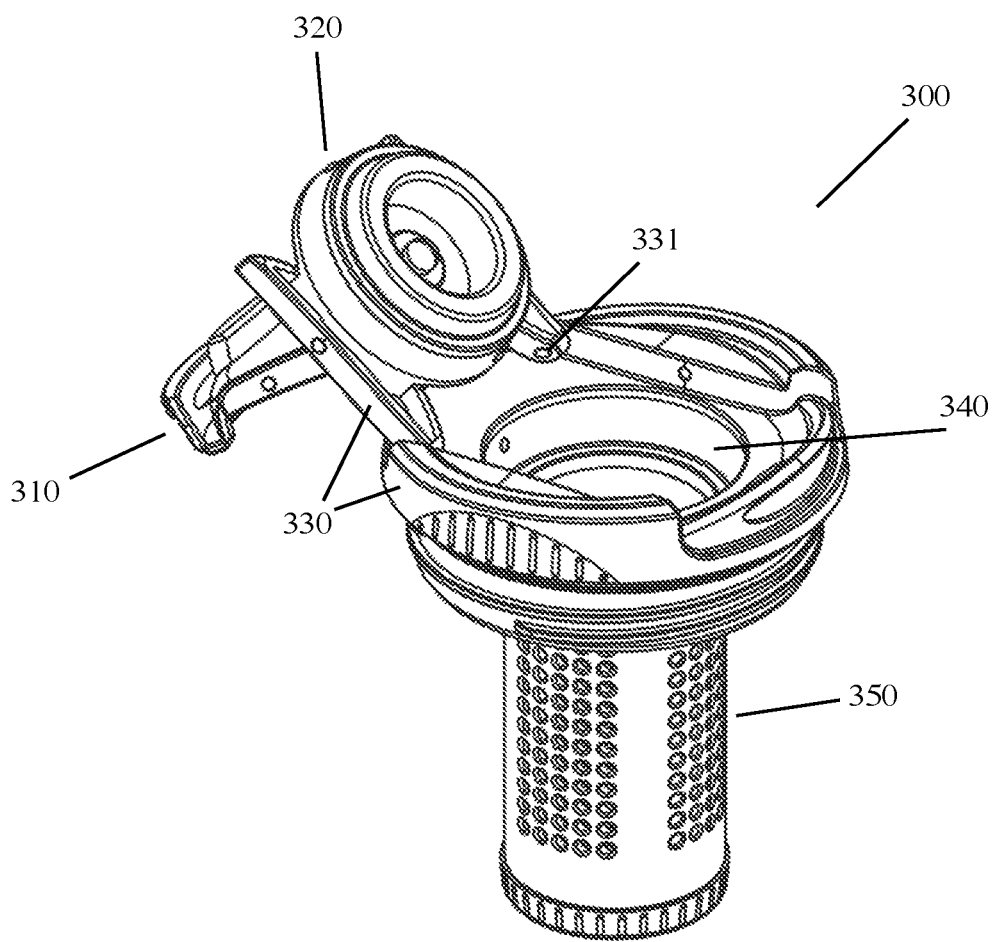
FIG. 3 is a perspective view of a mug cap and infuser assembled, and in a fully open position.

Referring to FIG. 3, an assembled exemplary mug cap and strainer/infuser 300 is shown. FIG. 3 shows the first lid 310 is used as a pull tab to pull open the second lid 320. The inner halves of the oval bumps 330 scissor away from the outer halves on the pivot pin 331. As the second lid 320 is pulled open, the second opening 340 is exposed. When the second opening is open, a user can insert a removable infuser filled with coffee grinds or tea leaves, and fill the mug with hot water to start brewing. The perforated strainer 350 can accommodate a removable infuser, a commercial tea bag, or a variety of other brew materials. Moreover, where a POD brewing machine is available, the second opening, and easily opened second lid, let the user greatly enjoy the innovative and convenient brew-through capability of the current invention's mug cap. With just a gently pull of the first lid acting as a pull tab, the second lid is opened and ready to get a fill or refill from the POD brewer. Then, the user closes the second opening 340 by pressing the second lid 320 down tight to prevent spilling. The user can choose to plug the sipper opening by closing the first lid 310. This is recommended when she is about to travel. After certain brewing time, the user can open the first lid 310 to sip and enjoy the brew. If the user wants to remove the removable infuser after a preferred brewing time, she can gently yank the second lid 320 open, using the first lid 310 as a pull tab. The combination of the double hinges (a hole-and-pen and a pivot-pin), double lids, and the first lid functioning as a pull tab solves the limitations of the current mug caps, where a user desires to safely and conveniently remove brew waste after a preferred brewing time.

Figure 4:
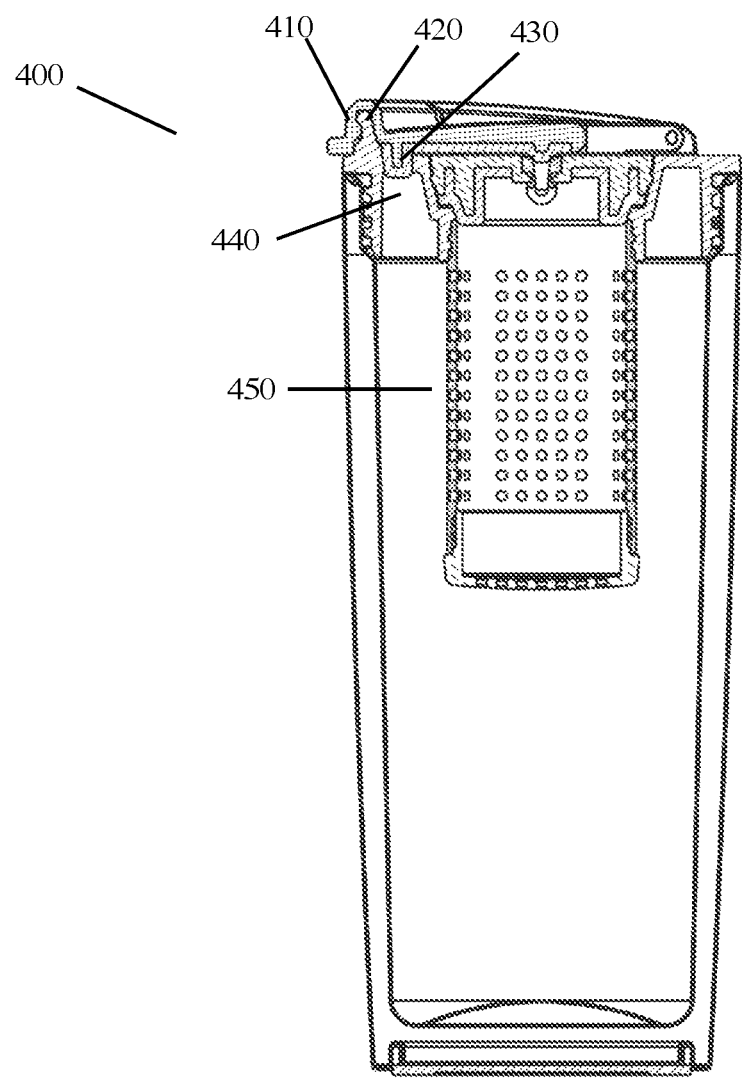
FIG. 4 is cross-sectional view of a mug and its cap being fully assembled and in a closed position.

Referring to FIG. 4, a cross-sectional view of an exemplary mug 400 and its cap is shown. The first lid's edge or blade 410 is upwardly convex, and a groove is formed beneath. The outer wall of the groove includes a resilient annular gripping portion that engages the raised rim 420 of the cap. The raised rim 420 comprises a bead running along the rim, on the outer wall. When the lid is pressed down, the resilient annular gripping portion expands outward until it grips the underside of the bead. The lid's bottom has a protruding tab 430 that, when the lid is pressed down, plugs the sipper opening 440, and prevents spillage. A strainer/infuser 450 is screwed in the second opening of the cap from the underside thereof. The infuser is covered with perforations for brewing in this embodiment. It is appreciated that many other types of infusers, e.g., wire mesh basket or metal cage basket, can be used. It is appreciated that tea bags can be dropped in the infuser, and safely and conveniently removed. It is also appreciated that a user can open both lids, using the first lid as a pull tab, and let the brew come down from the dispenser of a POD machine. Filling or refilling this way saves the user valuable time day after day, and provide convenience and enjoyment of using the current invention's mug caps.

The invention claimed is:

1. A mug cap apparatus for brew-through comprising
A cylindrical body having a primary shallow channel through the center of one end of said cylindrical body;
a first hole positioned in said shallow channel; a first lid that comprises a blade edge for ease of opening and a first plug that seals said first hole when said first lid is in closed configuration;
a second hole positioned in said shallow channel; a second lid that is positioned underneath said first lid and comprises a second plug that seals said second hole when said second lid is closed; said second lid further comprises at least one attachment point for attaching said second lid to the walls of said shallow channel;
wherein said first lid further comprises at least one attachment point for attaching said first lid to said second lid; wherein said at least one attachment point of said first lid and said at least one attachment point of said second lid are positioned in linear space apart along said shallow channel;
wherein said at least one attachment point of said first lid is positioned in proximity to the center of said shallow channel and said at least one attachment point of said second lid is positioned in proximity to the rim of said cylindrical body;
wherein said first lid in open configuration is a pull-tab of said second lid.

2. The apparatus of claim 1 further comprises a cylindrical strainer wherein the opening of said cylindrical strainer is attached to and sealed by said cylindrical body wherein said second hole is connected to said cylindrical strainer.

3. The apparatus of claim 2 wherein said cylindrical strainer further comprises circular filtration holes around its cylindrical surface.

4. The apparatus of claim 2 wherein said cylindrical strainer further comprises elongated filtration slits around its cylindrical surface.

\* \* \* \* \*